Patented Sept. 20, 1927.

1,642,942

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

SUBSTANCE AND PROCESS FOR USING THE SAME FOR REFRIGERATION PURPOSES.

No Drawing.   Application filed April 23, 1923. Serial No. 634,183.

My invention relates to a substance and a process of using the same for refrigeration purposes, whether for making ice, cold storage work, cooling water for air conditioning, or other cooling purposes.

Ammonia, ether, sulphur dioxide, carbon dioxide, ethylchloride, carbon tetrachloride and various other substances are known to be capable of use as refrigerants in refrigeration systems, but it is well recognized that they all have properties which make their use more or less objectionable, or dangerous, and some of them are not suitable for certain classes of refrigeration, such for instance as a compression system employing centrifugal compression and adapted for cooling water which is used for dehumidifying, cooling or otherwise conditioning air for ventilation and other purposes. A very serious objection to most of the better known refrigerants is that they are poisonous and some of them actively attack metals, others are explosive and dangerous or troublesome to handle, and some are so expensive as to preclude their economical commercial use. For example, ammonia, which is probably the most commonly used refrigerant, on account of the high pressures required for condensing it, and its corrosive action, necessitates the employment of heavy and cumbersome iron apparatus including a reciprocating compressor, and since this substance is poisonous, its use is very dangerous. Ethylchloride and sulphur dioxide also are poisonous and cause corrosion. A refrigeration system employing centrifugal compression, in order to be efficient and economical in operation should be adapted to handle large volumes of gas at low differences of pressure in the evaporator and condenser, and the refrigerant used should have a low vapor pressure and high specific density. It is also desirable for some purposes to have the system operate below atmospheric pressure in the condenser as well as in the evaporator.

One object of my invention is to provide an improved process of refrigeration which, on account of the properties of the refrigerant used overcomes the objections incident to and has important practical advantages over the refrigeration processes heretofore practiced. Another object of my invention is to provide a practical and efficient process of refrigeration in which the refrigerant is compressed by centrifugal action and is both evaporated and condensed at pressures below atmospheric pressure.

After much experimentation and research, I have discovered that dichloroethylene has ideal characteristics for use as a refrigerating medium. This substance is an unsaturated halogen derivative of hydrocarbons of the ethylenic series, having the formula $C_2H_2CL_2$. Dichloroethylene has absolutely no deleterious effect on any metals at any temperature, either in the liquid or gaseous state, or in the presence of water, but on the contrary prevents corrosion. It does not volatilize to any appreciable extent at ordinary atmospheric temperatures and pressures, its boiling point being approximately 125 degrees Fahrenheit. It will not freeze at any temperature which will be encountered. The gas is heavy (three and one-third times the weight of air), and does not readily diffuse or spread. Therefore, any part of the refrigerating apparatus can be opened up at any time without removing the liquid and without objection from fumes or odors. The fumes of the exposed liquid are not objectionable in quantity or quality, a striking contrast to most refrigerants. The liquid will not explode or readily burn, but on the contrary will extinguish a fire. It can be handled like water in open containers with entire safety. Dichloroethylene is also comparatively cheap and can be readily obtained in the required quantities.

In my process of refrigeration, using either of these refrigerants, the refrigerant liquid is evaporated by the heat abstracted from the water or other agent or enclosure being cooled, and the refrigerant vapor is compressed and then condensed, the liquefied and cooled refrigerant being returned to be again evaporated, this cycle of operations being continuous. Preferably, a centrifugal compressor is used which produces only a moderate difference in pressure and the refrigerant is condensed as well as evaporated at a pressure below atmospheric pressure so that the entire system is under a partial vacuum, ordinarily of fifteen inches or more.

I claim as my invention:—

1. A refrigerating process which comprises evaporating dichloroethylene by reducing the pressure thereon below atmospheric pressure, compressing the resulting vapor by centrifugal action to a pressure below atmospheric pressure and cooling the same to liquefy the vapor, and returning the liquefied dichlorethylene to be again vaporized.

2. A process of refrigeration which comprises evaporating, compressing and condensing dichlorethylene under a pressure at all times not materially greater than one atmosphere.

3. A process of refrigeration which comprises evaporating, compressing and condensing dichlorethylene all in a partial vacuum.

4. A process of refrigeration which comprises evaporating, compressing by centrifugal action, and then condensing dichlorethylene under a pressure at all times not materially greater than one atmosphere.

5. A process of refrigeration which comprises evaporating, compressing by centrifugal action, and condensing dichlorethylene all in a partial vacuum.

6. The process of refrigeration which comprises evaporating dichlorethylene at a pressure below atmospheric pressure, compressing the evaporated dichlorethylene, and condensing the compressed dichlorethylene at a pressure not materially greater than approximately atmospheric pressure.

7. A refrigerating device, comprising an evaporator, a compressor and a condenser connected together in a closed circulatory system, and a quantity of dichlorethylene in said system, the pressure in said evaporator being less than atmospheric pressure.

8. A refrigerating device, comprising an evaporator, a compressor and a condenser connected together in a closed circulatory system, and a quantity of dichlorethylene in said system, the pressure in said evaporator being less than atmospheric pressure, and pressure in said condenser not materially greater than approximately atmospheric pressure.

9. A refrigerating device comprising an evaporator, a compressor and a condenser connected together in a closed circulatory system, and a quantity of dichlorethylene in said system, the pressure in said evaporator being less than atmospheric pressure, and the pressure in said condenser being less than atmospheric.

10. A refrigerating device having an evaporator, centrifugal compressor and condenser connected in a closed circulatory system, and dichlorethylene as the refrigerating medium.

11. A refrigerating device including an evaporator, centrifugal compressor and condenser connected in a closed circulatory system, and containing therein dichlorethylene as the refrigerating medium, the differences in internal pressure between the compressor, condenser and evaporator being relatively small.

WILLIS H. CARRIER.